(12) United States Patent
Nakamoto et al.

(10) Patent No.: US 10,270,122 B2
(45) Date of Patent: Apr. 23, 2019

(54) LIQUID ELECTROLYTE FOR FLUORIDE ION BATTERY AND FLUORIDE ION BATTERY

(71) Applicants: TOYOTA JIDOSHA KABUSHIKI KAISHA, Toyota-shi, Aichi-ken (JP); KYOTO UNIVERSITY, Kyoto-shi, Kyoto-fu (JP)

(72) Inventors: Hirofumi Nakamoto, Kyoto (JP); Zempachi Ogumi, Kyoto (JP); Jun-ichi Yamaki, Kyoto (JP)

(73) Assignees: TOYOTA JIDOSHA KABUSHIKI KAISHA, Toyota (JP); KYOTO UNIVERSITY, Kyoto-shi (JP)

( * ) Notice: Subject to any disclaimer, the term of this patent is extended or adjusted under 35 U.S.C. 154(b) by 0 days.

(21) Appl. No.: 15/041,468

(22) Filed: Feb. 11, 2016

(65) Prior Publication Data

US 2016/0261003 A1    Sep. 8, 2016

(30) Foreign Application Priority Data

Mar. 6, 2015 (JP) ................... 2015-045219

(51) Int. Cl.
*H01M 10/05* (2010.01)
*H01M 10/0568* (2010.01)
*H01M 10/0569* (2010.01)

(52) U.S. Cl.
CPC ....... *H01M 10/05* (2013.01); *H01M 10/0568* (2013.01); *H01M 10/0569* (2013.01); *H01M 2300/0045* (2013.01)

(58) Field of Classification Search
CPC .......... H01M 10/05; H01M 10/0568; H01M 10/0569; H01M 2300/0045
See application file for complete search history.

(56) References Cited

U.S. PATENT DOCUMENTS

| | | | |
|---|---|---|---|
| 2007/0292766 A1* | 12/2007 | Yamaguchi | C07F 5/04 429/324 |
| 2009/0029237 A1* | 1/2009 | Yazami | H01M 4/38 429/50 |
| 2011/0076572 A1* | 3/2011 | Amine | H01M 10/05 429/328 |
| 2012/0164541 A1 | 6/2012 | Darolles et al. | |
| 2014/0023941 A1* | 1/2014 | Amine | H01M 10/0568 429/405 |
| 2015/0037690 A1* | 2/2015 | Dalavi | H01M 10/0567 429/331 |

(Continued)

FOREIGN PATENT DOCUMENTS

| | | |
|---|---|---|
| CN | 103563154 A | 2/2014 |
| JP | 2010277935 A | 12/2010 |
| JP | 2014501434 A | 1/2014 |

(Continued)

*Primary Examiner* — Scott J. Chmielecki
(74) *Attorney, Agent, or Firm* — Oliff PLC

(57) ABSTRACT

A problem of the present invention is to provide a liquid electrolyte for a fluoride ion battery, in which fluoride anion conductivity is imparted to an ionic liquid containing fluoride complex anions. The present invention solves the problem by providing a liquid electrolyte for a fluoride ion battery, which comprises an ionic liquid containing specific fluoride complex anions and an anion acceptor having a specific acceptor number.

16 Claims, 1 Drawing Sheet

(56) References Cited

U.S. PATENT DOCUMENTS

2015/0214577 A1* 7/2015 O'Neill ............ H01M 10/0567
429/50
2017/0033359 A1* 2/2017 Ogumi ................. H01M 4/582

FOREIGN PATENT DOCUMENTS

KR 2014-0025330 A 3/2014
WO 2012/087414 A2 6/2012

* cited by examiner

LIQUID ELECTROLYTE FOR FLUORIDE ION BATTERY AND FLUORIDE ION BATTERY

TECHNICAL FIELD

The present invention relates to a liquid electrolyte for a fluoride ion battery, in which fluoride anion conductivity is imparted to an ionic liquid containing fluoride complex anions.

BACKGROUND ART

For example, an Li ion battery is known as a high-voltage and high-energy density battery. The Li ion battery is a cation-based battery utilizing a reaction between an Li ion and a cathode active material and a reaction between an Li ion and an anode active material. Meanwhile, as an anion-based battery, a fluoride ion battery utilizing a reaction of a fluoride ion is known.

Also, it is known that an ionic liquid is used for a liquid electrolyte. For example, in Patent Literature 1, a nonaqueous electrolyte secondary battery provided with an electrolyte having an ionic liquid and a lithium salt is disclosed. In addition, as the ionic liquid, an ionic liquid containing fluoride complex anions such as 1-butylpyridinium tetrafluoroborate is disclosed.

Also, in Patent Literature 2, a fluoride ion battery provided with an electrolyte dissolving a fluoride salt in a solvent and an addition agent including a fluoride composite producing species is disclosed. In addition, examples of the solvent include an ionic liquid (claim 14). Also, examples of the fluoride composite producing species include tris(pentafluorophenyl)borane (claim 3).

CITATION LIST

Patent Literatures

Patent Literature 1: Japanese Patent Application Laid-Open No. 2010-277935
Patent Literature 2: Japanese Patent Application Laid-Open No. 2014-501434

SUMMARY OF INVENTION

Technical Problem

An ionic liquid is generally very high in chemical stability and thermal stability. An ionic liquid has been conventionally used as a solvent by utilizing its high stability. For example, in Patent Literature 1, an ionic liquid containing fluoride complex anions (such as $BF_4^-$) is used as a solvent for a lithium battery.

Fluoride complex anions are very high in stability whereas they ordinarily do not have fluoride anion conductivity. Incidentally, 'fluoride anion conductivity' in the present invention signifies ion conductivity in a broad sense with regard to fluoride ions. Fluoride ions conduct with difficulty by ion alone and occasionally conduct as fluoride anions (such as fluoride complex anions). Thus, in the present invention, the term of fluoride anion conductivity is used. Meanwhile, in the field of a fluoride ion battery, the development of a liquid electrolyte having fluoride anion conductivity has been demanded.

The present invention has been made under the circumstances, and a main object thereof is to provide a liquid electrolyte for a fluoride ion battery, in which fluoride anion conductivity is imparted to an ionic liquid containing fluoride complex anions.

Solution to Problem

In order to achieve the object, through earnest studies, the present inventors of the present invention have found out that an anion acceptor acts on an ionic liquid containing fluoride complex anions to develop fluoride anion conductivity. The present invention is based on such findings.

That is, in the present invention, there is provided a liquid electrolyte for a fluoride ion battery, comprising: an ionic liquid containing a fluoride complex anion represented by the following general formula (1), and an anion acceptor with an acceptor number of 75 or more; or an ionic liquid containing a fluoride complex anion represented by the following general formula (2), and an anion acceptor with an acceptor number of 70 or more

[Chemical formula 1]

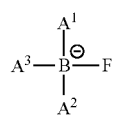

General Formula (1)

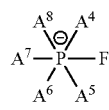

General Formula (2)

In the formula, $A^1$ to $A^8$ are each independently fluorine, an alkyl group with a carbon number of 5 or less, a fluoroalkyl group with a carbon number of 5 or less, or an ether group such that part of carbon of the alkyl group or the fluoroalkyl group is substituted with oxygen.

According to the present invention, a specific anion acceptor acts on an ionic liquid containing fluoride complex anions, so as to impart fluoride anion conductivity.

In the invention, it is preferable that the anion acceptor is tripentafluorophenylborane.

In the invention, it is preferable that the liquid electrolyte for a fluoride ion battery does not contain a fluoride salt.

In addition, in the present invention, there is provided a fluoride ion battery comprising a cathode active material layer, an anode active material layer, and an electrolyte layer formed between the cathode active material layer and the anode active material layer, wherein the electrolyte layer contains the liquid electrolyte for a fluoride ion battery described above.

According to the present invention, the use of the liquid electrolyte for a fluoride ion battery described above provides the fluoride ion battery with favorable ion conductivity.

Advantageous Effects of Invention

A liquid electrolyte for a fluoride ion battery of the present invention produces an effect of imparting fluoride anion conductivity to an ionic liquid containing fluoride complex anions.

DESCRIPTION OF EMBODIMENTS

Figure 1:
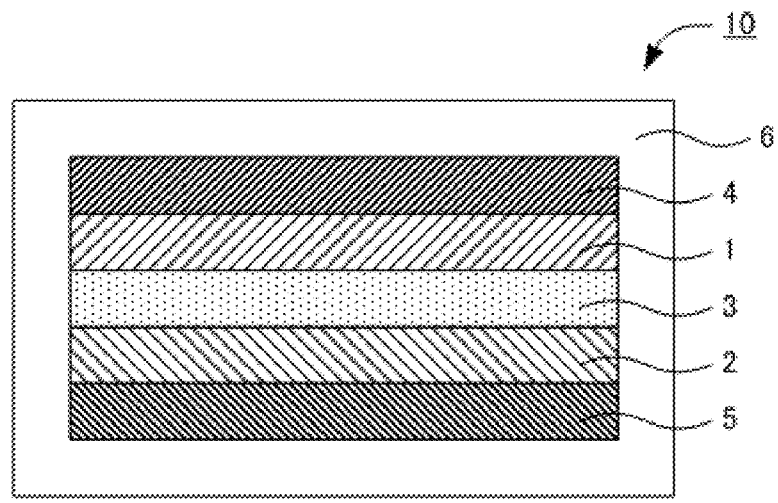
FIG. 1 is a schematic sectional view showing an example of a fluoride ion battery of the present invention.

A liquid electrolyte for a fluoride ion battery and a fluoride ion battery of the present invention are hereinafter described in detail.

A. Liquid Electrolyte for Fluoride Ion Battery

A liquid electrolyte for a fluoride ion battery of the present invention comprises an ionic liquid containing fluoride complex anions represented by the general formula (1) and an anion acceptor with an acceptor number of 75 or more, or an ionic liquid containing fluoride complex anions represented by the general formula (2) and an anion acceptor with an acceptor number of 70 or more.

According to the present invention, a specific anion acceptor acts on an ionic liquid containing fluoride complex anions, so as to impart fluoride anion conductivity. Thus, fluoridation and defluoridation of an active material may be realized.

As described above, fluoride complex anions are very high in stability. The reason therefor is that a bond (B—F bond, P—F bond) in the fluoride complex anions has so high ionic bonding that fluoride ions (F$^-$) do not dissociate. Meanwhile, in the present invention, it is guessed that the addition of a strong anion acceptor causes an element (such as boron) in the anion acceptor to weaken the bond (B—F bond, P—F bond) in the fluoride complex anions and develop fluoride anion conductivity. Also, it is guessed that P—F bond is lower in ionic bonding than B—F bond as to develop fluoride anion conductivity even though an anion acceptor with low acceptor number is used.

Also, as described above, in Patent Literature 2, a fluoride ion battery provided with an electrolyte dissolving a fluoride salt in a solvent and an addition agent including a fluoride composite producing species is disclosed, examples of the solvent include an ionic liquid, and examples of the fluoride composite producing species include tris(pentafluorophenyl)borane. However, in Patent Literature 2, an ionic liquid containing fluoride complex anions is not described or suggested. The reason therefor is guessed to be that the fluoride complex anions are thought not to be suitable for a liquid electrolyte for a fluoride ion battery.

The liquid electrolyte for a fluoride ion battery of the present invention is hereinafter described in each constitution.

1. Ionic Liquid Containing Fluoride Complex Anions

An ionic liquid in the present invention contains fluoride complex anions represented by the following general formula (1) or (2).

[Chemical formula 2]

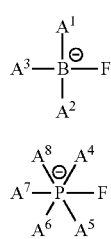

General Formula (1)

General Formula (2)

In the general formulae (1) and (2), $A^1$ to $A^8$ are each independently fluorine, an alkyl group with a carbon number of 5 or less, a fluoroalkyl group with a carbon number of 5 or less, or an ether group such that part of carbon of the alkyl group or the fluoroalkyl group is substituted with oxygen.

In the case where $A^1$ to $A^8$ have a carbon chain, the carbon number may be any of 5, 4, 3, 2 and 1. The alkyl group may be a straight-chain alkyl group or a branched-chain alkyl group. The fluoroalkyl group is a group such that part or all of hydrogen of the alkyl group is substituted with fluorine. The oxygen number contained in the ether group may be 2 or less, or 1, for example. Examples of the fluoride complex anions include $BF_4^-$, $PF_6^-$ and $(C_2F_5)_3PF_3^-$.

Kinds of counter cations to the fluoride complex anions are not particularly limited but examples thereof include imidazolium, pyridinium, ammonium, piperidinium, pyrrolidinium, phosphonium and sulfonium. Specific examples thereof include 1-ethyl-3-methylimidazolium, 1-butyl-3-methylimidazolium, 1-ethyl-2,3-dimethylimidazolium, 1-butyl-2,3-dimethylimidazolium, 1-ethylpyridinium, 1-propylpyridinium, 1-butylpyridinium, N,N,N-trimethyl-N-propylammonium, ethyldimethylpropylammonium, N,N-diethyl-N-methyl-N-propylammonium, N,N-diethyl-N-methyl-N-(2-methoxyethyl)ammonium, 1-methyl-1-propylpiperidinium, 1-butyl-1-methylpiperidinium, 1-methyl-1-propylpyrrolidinium, 1-methyl-1-butylpyrrolidinium, 1-(methoxyethyl)-1-methylpyrrolidinium, triethylpentylphosphonium, tetrabutylphosphonium, triethylmethoxymethylphosphonium, triethyl-(2-methoxyethyl) phosphonium, triisobutylmethylphosphonium, diethylmethylsulfonium and triethylsulfonium.

2. Anion Acceptor

An anion acceptor in the present invention is ordinarily 70 or more in acceptor number. The acceptor number (AN) is one index of electron acceptability. The details of the acceptor number may be referred to Inorganic Chemistry Communications 14 (2011) 1753-1755, for example. The acceptor number is preferably 75 or more. Meanwhile, the acceptor number is 90 or less, for example.

The anion acceptor preferably contains an element of the thirteenth to fifteenth families in the periodic table, for example. Above all, the anion acceptor preferably contains an element of the thirteenth family, particularly B (boron). Also, examples of a functional group contained in the anion acceptor include an aryl group such as a phenyl group, a phenoxy group, a catechol group, and a functional group such that part or all of these functional groups is fluoridated. Examples of the anion acceptor include tripentafluorophenylborane (TPFPB), 2,3,4,5,6-pentafluorophenylcatecholborate and trispentafluorophenyl borate.

The concentration of the anion acceptor in the liquid electrolyte for a fluoride ion battery is not particularly limited, but is, for example, 0.01 mol/kg or more, preferably 0.05 mol/kg or more, and more preferably 0.1 mol/kg or more. Meanwhile, the concentration of the anion acceptor may be 1 mol/kg or less, or 0.4 mol/kg or less, for example.

The ratio between the anion acceptor and the fluoride complex anions is not particularly limited, but in the case where the anion acceptor is regarded as 1 part by mol, the fluoride complex anions may be 5 parts by mol or more, or 10 parts by mol or more, for example. Meanwhile, the fluoride complex anions are, for example, 100 parts by mol or less, preferably 60 parts by mol or less, and more preferably 20 parts by mol or less.

3. Fluoride Salt

The liquid electrolyte for a fluoride ion battery of the present invention may contain a fluoride salt or not. 'Fluoride salt' signifies a salt whose anion part is F. The fluoride salt may be an organic fluoride salt or an inorganic fluoride salt. Also, the fluoride salt may be an ionic liquid.

A cation of the fluoride salt is not particularly limited but examples thereof include a complex cation. Examples of the complex cation include alkylammonium cation, alkylphosphonium cation and alkylsulfonium cation. Other examples of the cation of the fluoride salt include a cation of alkali metal. Examples of the alkali metal include Li, Na, K, Rb and Cs.

The concentration of the fluoride salt in the liquid electrolyte for a fluoride ion battery is not particularly limited, but is, for example, 0.1 mol/L or more, preferably 0.3 mol/L or more, and more preferably 0.5 mol/L or more. Meanwhile, the concentration of the fluoride salt is, for example, 6 mol/L or less, preferably 3 mol/L or less. Also, as described above, the liquid electrolyte for a fluoride ion battery may not contain a fluoride salt. 'Not contain a fluoride salt' signifies that the concentration of the fluoride salt is less than 0.1 mol/L, preferably 0.05 mol/L or less, and more preferably 0.01 mol/L or less.

4. Liquid Electrolyte for Fluoride Ion Battery

The liquid electrolyte for a fluoride ion battery of the present invention ordinarily contains an ionic liquid containing fluoride complex anions represented by the general formula (1) or (2) as a solvent. The solvent of the liquid electrolyte for a fluoride ion battery may be only the ionic liquid or a mixture of the ionic liquid and another solvent. The ratio of the ionic liquid to all solvents is, for example, 10 mol % or more, preferably 30 mol % or more, more preferably 50 mol % or more, far more preferably 70 mol % or more, and particularly preferably 90 mol % or more.

Examples of another solvent include an ionic liquid and a nonaqueous solvent. The ionic liquid signifies a material with a melting point of 100° C. or less. Above all, the melting point of the ionic liquid is preferably 50° C. or less, and more preferably 25° C. or less.

Examples of a cation of the ionic liquid include piperidinium skeleton cation, pyrrolidinium skeleton cation, imidazolium skeleton cation, ammonium cation and phosphonium cation.

Examples of an anion of the ionic liquid include amide anions typified by bisfluorosulfonylamide (FSA) anion and bistrifluoromethanesulfonylamide (TFSA) anion, phosphate anions typified by hexafluorophosphate anion and tris(pentafluoroethyl)trifluorophosphate anion, tetrafluoroborate (TFB) anion, and triflate anion.

Kinds of the nonaqueous solvent are not particularly limited, but examples thereof include ethylene carbonate (EC), fluoroethylene carbonate (FEC), difluoroethylene carbonate (DFEC), propylene carbonate (PC), dimethyl carbonate (DMC), diethyl carbonate (DEC), ethyl methyl carbonate (EMC), butylene carbonate (BC), γ-butyrolactone, sulfolane, acetonitrile, 1,2-dimethoxymethane, 1,3-dimethoxypropane, diethyl ether, tetrahydrofuran, 2-methyltetrahydrofuran, dimethyl sulfoxide (DMSO), and any mixtures thereof.

Incidentally, with regard to $F(HF)_x^-$ anion, $F^-$ hardly dissociates from HF. Incidentally, "x" is a real number (resistance, impedance) larger than 0 and satisfies $0<x\leq5$, for example. Thus, it is preferable that the liquid electrolyte for a fluoride ion battery does not contain $F(HF)_x^-$ anion. 'Not contain $F(HF)_x^-$ anion' signifies that the ratio of $F(HF)_x^-$ anion to all anions existing in the liquid electrolyte is 0.5 mol % or less. The ratio of $F(HF)_x^-$ anion is preferably 0.3 mol % or less.

B. Fluoride Ion Battery

FIG. 1 is a schematic sectional view showing an example of the fluoride ion battery of the present invention. A fluoride ion battery 10 shown in FIG. 1 comprises a cathode active material layer 1, an anode active material layer 2, an electrolyte layer 3 formed between the cathode active material layer 1 and the anode active material layer 2, a cathode current collector 4 for collecting the cathode active material layer 1, an anode current collector 5 for collecting the anode active material layer 2, and a battery case 6 for storing these members. Also, the electrolyte layer 3 contains the 'A. Liquid electrolyte for fluoride ion battery'.

According to the present invention, the use of the liquid electrolyte for a fluoride ion battery described above provides the fluoride ion battery with favorable ion conductivity.

The fluoride ion battery of the present invention is hereinafter described in each constitution.

1. Electrolyte Layer

The electrolyte layer in the present invention is a layer formed between the cathode active material layer and the anode active material layer. In the present invention, the electrolyte layer contains the liquid electrolyte for a fluoride ion battery described above. The thickness of the electrolyte layer varies greatly with constitutions of the battery, and is not particularly limited.

2. Cathode Active Material Layer

The cathode active material layer in the present invention is a layer containing at least the cathode active material. Also, the cathode active material layer may further contain at least one of a conductive material and a binder in addition to the cathode active material.

The cathode active material in the present invention is ordinarily an active material which is defluoridated during discharge. Examples of the cathode active material include a metal alone, an alloy, a metal oxide, and fluorides thereof. Examples of metallic element contained in the cathode active material include Cu, Ag, Ni, Co, Pb, Ce, Mn, Au, Pt, Rh, V, Os, Ru, Fe, Cr, Bi, Nb, Sb, Ti, Sn and Zn. Above all, the cathode active material is preferably Cu, $CuF_x$, Fe, $FeF_x$, Ag and $AgF_x$. Incidentally, the "x" is a real number "resistance, impedance) larger than 0. Also, other examples of the cathode active material include a carbon material and fluorides thereof. Examples of the carbon material include graphite, coke and carbon nanotube. Also, further examples of the cathode active material include a polymer material. Examples of the polymer material include polyaniline, polypyrrole, polyacetylene and polythiophene.

The conductive material is not particularly limited if the material is such as to have desired electron conduction, but examples thereof include a carbon material. Examples of the carbon material include carbon black such as acetylene black, Ketjen Black, furnace black and thermal black. Meanwhile, the binder is not particularly limited if the binder is such as to be chemically and electrically stable, but examples thereof include fluorine-based binders such as polyvinylidene fluoride (PVDF) and polytetrafluoroethylene (PTFE). Also, the content of the cathode active material in the cathode active material layer is preferably larger from the viewpoint of capacity. Also, the thickness of the cathode active material layer varies greatly with constitutions of the battery, and is not particularly limited.

3. Anode Active Material Layer

The anode active material layer in the present invention is a layer containing at least the anode active material. Also, the anode active material layer may further contain at least one of a conductive material and a binder in addition to the anode active material.

The anode active material in the present invention is ordinarily an active material which is fluoridated during discharge. Also, an optional active material having lower potential than the cathode active material may be selected for the anode active material. Thus, the cathode active material described above may be used as the anode active material. Examples of the anode active material include a metal alone, an alloy, a metal oxide, and fluorides thereof. Examples of metallic element contained in the anode active material include La, Ca, Al, Eu, Li, Si, Ge, Sn, In, V, Cd, Cr, Fe, Zn, Ga, Ti, Nb, Mn, Yb, Zr, Sm, Ce, Mg and Pb. Above all, the anode active material is preferably Mg, $MgF_x$, Al, $AlF_x$, Ce, $CeF_x$, Ca, $CaF_x$, Pb and $PbF_x$. Incidentally, the "x" is a real number (resistance, impedance) larger than 0. Also, the carbon material and the polymer material described above may be used as the anode active material.

The same material as the material described in the cathode active material layer may be used for the conductive material and the binder. Also, the content of the anode active material in the anode active material layer is preferably larger from the viewpoint of capacity. Also, the thickness of the anode active material layer varies greatly with constitutions of the battery, and is not particularly limited.

4. Other Constitutions

The fluoride ion battery of the present invention comprises at least the anode active material layer, the cathode active material layer and the electrolyte layer described above, ordinarily further comprising a cathode current collector for collecting the cathode active material layer and an anode current collector for collecting the anode active material layer. Examples of the shape of the current collectors include a foil shape, a mesh shape and a porous shape. Also, the fluoride ion battery of the present invention may have a separator between the cathode active material layer and the anode active material layer. The reason therefor is to provide the battery with higher safety.

5. Fluoride Ion Battery

The fluoride ion battery of the present invention is not particularly limited if the battery is such as to have the cathode active material layer, the anode active material layer and the electrolyte layer described above. Also, the fluoride ion battery of the present invention may be a primary battery or a secondary battery, preferably a secondary battery among them. The reason therefor is to be repeatedly charged and discharged and be useful as a car-mounted battery, for example. Also, examples of the shape of the fluoride ion battery of the present invention include a coin shape, a laminate shape, a cylindrical shape and a rectangular shape.

Incidentally, the present invention is not limited to the above embodiments. The embodiments are exemplification, and any is included in the technical scope of the present invention if it has substantially the same constitution as the technical idea described in the claim of the present invention and offers similar operation and effect thereto.

EXAMPLES

The present invention is described more specifically by showing examples hereinafter. Incidentally, all used reagents are reagents subject to vacuum drying at 120° C. for 20 hours or more.

Example 1

Tripentafluorophenylborane ($B(C_6F_5)_3$, manufactured by Aldrich, acceptor number: 78.2±0.3) as an anion acceptor and N-butylpyridinium tetrafluoroborate (manufactured by Merck Ltd. Japan) as an ionic liquid were mixed at a molar ratio of anion acceptor:ionic liquid=1:52, and stirred uniformly to thereby obtain an evaluation test sample. Incidentally, the concentration of the anion acceptor is 0.08 mol/kg.

Example 2

An evaluation test sample was obtained in the same manner as Example 1 except for modifying the molar ratio of anion acceptor and ionic liquid into anion acceptor:ionic liquid=1:30.8. Incidentally, the concentration of the anion acceptor is 0.13 mol/kg.

Example 3

An evaluation test sample was obtained in the same manner as Example 1 except for modifying the molar ratio of anion acceptor and ionic liquid into anion acceptor:ionic liquid=1:12.4. Incidentally, the concentration of the anion acceptor is 0.30 mol/kg.

Example 4

An evaluation test sample was obtained in the same manner as Example 1 except for modifying the molar ratio of anion acceptor and ionic liquid into anion acceptor:ionic liquid=1:8.5. Incidentally, the concentration of the anion acceptor is 0.40 mol/kg.

Comparative Example 1

N-butylpyridinium tetrafluoroborate (manufactured by Merck Ltd. Japan) as an ionic liquid was regarded as an evaluation test sample.

Comparative Example 2

N-butylpyridiniumbistrifluoromethanesulfonylimide (manufactured by Merck Ltd. Japan) as an ionic liquid was regarded as an evaluation test sample.

Comparative Example 3

Tripentafluorophenylborane ($B(C_6F_5)_3$, manufactured by Aldrich, acceptor number: 78.2±0.3) as an anion acceptor and N-butylpyridiniumbistrifluoromethanesulfonylimide (manufactured by Merck Ltd. Japan) as an ionic liquid were mixed at a molar ratio of anion acceptor:ionic liquid=1:50, and stirred uniformly to thereby obtain an evaluation test sample. Incidentally, the concentration of the anion acceptor is 0.05 mol/kg.

Comparative Example 4

An evaluation test sample was obtained in the same manner as Comparative Example 3 except for modifying the molar ratio of anion acceptor and ionic liquid into anion acceptor:ionic liquid=1:29.3. Incidentally, the concentration of the anion acceptor is 0.08 mol/kg.

[Evaluations]

The fluoride anion conductivity of the evaluation test sample each obtained in Examples 1 to 4 and Comparative Examples 1 to 4 was evaluated. In order to lower dependence on viscosity, the fluoride anion conductance ($\sigma F^-$) was calculated by the following expression.

$$\sigma F^- = \sigma_1 - \sigma_0 \times ((\eta_0 \times \rho_0 \times C_1)/((\eta_1 \times \rho_1 \times C_0))$$

σ₁: ion conductance of the evaluation test sample to which an anion acceptor was added σ₀: ion conductance of the evaluation test sample to which an anion acceptor was not added (ionic liquid alone)

η₁: kinematic viscosity of the evaluation test sample to which an anion acceptor was added η₀: kinematic viscosity of the evaluation test sample to which an anion acceptor was not added (ionic liquid alone)

ρ₁: density of the evaluation test sample to which an anion acceptor was added

ρ₀: density of the evaluation test sample to which an anion acceptor was not added (ionic liquid alone)

C₁: ion molarity of the evaluation test sample to which an anion acceptor was added C₀: ion molarity of the evaluation test sample to which an anion acceptor was not added (ionic liquid alone)

The ion conductance was measured by using a conductance meter (SevenGo Pro™ manufactured by Mettler-Toledo International Inc.) in such a manner that the evaluation test sample was maintained at a liquid temperature of 25° C. in a constant temperature bath in a glove box under an Ar atmosphere. The kinematic viscosity was measured by using an oscillational viscometer (VISCOMATE VM-10A-M™ manufactured by TGK) in such a manner that the evaluation test sample was maintained at a liquid temperature of 25° C. in a constant temperature bath in a glove box under an Ar atmosphere. The results of the fluoride anion conductance (σF⁻) are shown in FIG. 2 and Table 1.

TABLE 1

| | DENSITY OF ANION ACCEPTOR (mol/kg) | FLUORIDE ANION CONDUCTANCE σF⁻ (μm/cm) |
|---|---|---|
| EXAMPLE 1 | 0.08 | 124 |
| EXAMPLE 2 | 0.13 | 140 |
| EXAMPLE 3 | 0.30 | 256 |
| EXAMPLE 4 | 0.40 | 73 |
| COMPARATIVE EXAMPLE 1 | 0 | 0 |
| COMPARATIVE EXAMPLE 2 | 0 | 0 |
| COMPARATIVE EXAMPLE 3 | 0.05 | −105 |
| COMPARATIVE EXAMPLE 4 | 0.08 | −14 |

Figure 2:
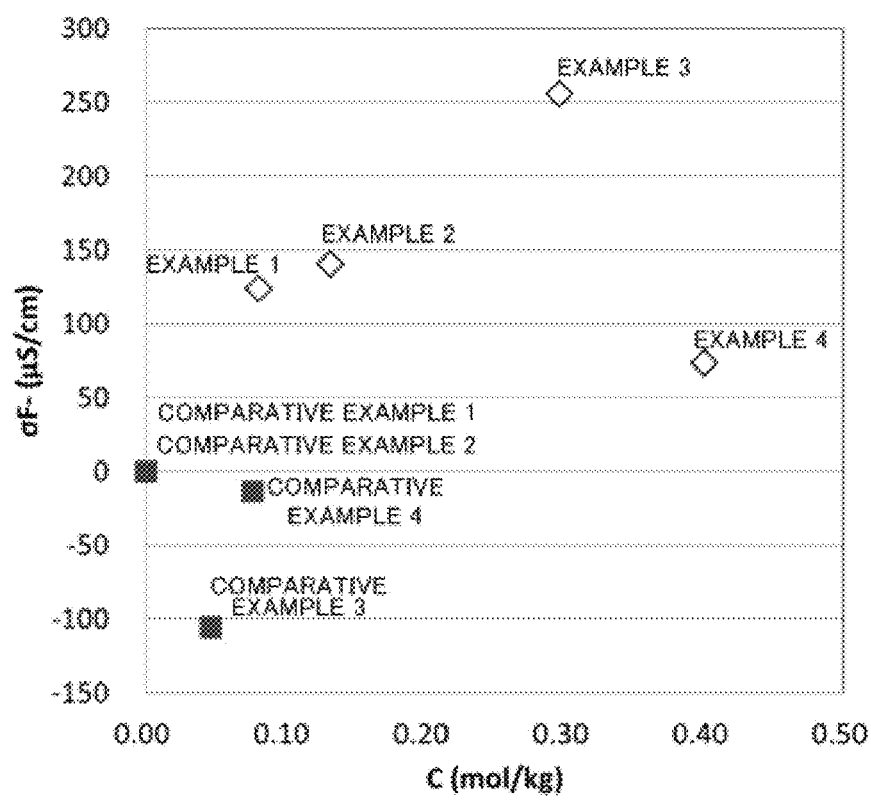
FIG. 2 is a result of measuring fluoride anion conductivity for an evaluation test sample each obtained in Examples 1 to 4 and Comparative Examples 1 to 4.

As shown in FIG. 2 and Table 1, in Examples 1 to 4, the fluoride anion conductance improved as compared with Comparative Example 1. Also, the ionic liquid containing fluoride complex anions (BF₄⁻) was used in Examples 1 to 4, whereas the ionic liquid not containing fluoride complex anions was used in Comparative Examples 3 and 4. In Comparative Examples 3 and 4, the addition of the anion acceptor deteriorated the fluoride anion conductance as compared with Comparative Example 2.

REFERENCE SIGNS LIST 1 cathode active material layer
2 anode active material layer
3 electrolyte layer
4 cathode current collector
5 anode current collector
6 battery case
10 fluoride ion battery

What is claimed is:

1. A battery comprising
a cathode active material layer,
an anode active material layer, and
an electrolyte layer formed between the cathode active material layer and the anode active material layer,
wherein
the battery is a fluoride ion battery,
the electrolyte layer contains a liquid electrolyte for a fluoride ion battery comprising:
an ionic liquid containing a fluoride complex anion represented by the following general formula (1), and an anion acceptor with an acceptor number of 75 or more, or
an ionic liquid containing a fluoride complex anion represented by the following general formula (2), and an anion acceptor with an acceptor number of 70 or more,

[Chemical formula 1]

General Formula (1)

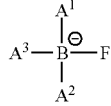

General Formula (2)

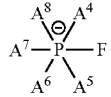

where $A^1$ to $A^8$ are each independently fluorine, an alkyl group with a carbon number of 5 or less, a fluoroalkyl group with a carbon number of 5 or less, or an ether group such that part of carbon of the alkyl group or the fluoroalkyl group is substituted with oxygen, and
the liquid electrolyte does not contain a fluoride salt, whose anion part is F.

2. The battery according to claim 1, wherein the anion acceptor is tripentafluorophenylborane.

3. The battery according to claim 1, wherein a concentration of the anion acceptor in the liquid electrolyte is 0.4 mol/kg or less.

4. The battery according to claim 2, wherein a concentration of the tripentafluorophenylborane in the liquid electrolyte is 0.4 mol/kg or less.

5. The battery according to claim 1, wherein a ratio of $F(HF)_x^-$ anion to all anions existing in the liquid electrolyte is 0.5 mol % or less.

6. The battery according to claim 1, wherein the cathode active material layer contains a cathode active material selected from the group consisting of a fluoride of a metal alone, a fluoride of an alloy, a fluoride of a metal oxide, a fluorinated carbon material, and a fluorinated polymer material.

7. The battery according to claim 6, wherein a metallic element contained in the cathode active material is at least one of Cu, Fe, Ag, Co, Bi, and Pb.

8. The battery according to claim 1, wherein the anode active material layer contains an anode active material selected from the group consisting of a fluoride of a metal alone, a fluoride of an alloy, a fluoride of a metal oxide, a fluorinated carbon material, and a fluorinated polymer material.

9. The battery according to claim 8, wherein a metallic element contained in the anode active material is at least one of Mg, Al, Ce, Ca, La, and Pb.

10. A battery comprising
a cathode active material layer,
an anode active material layer, and
an electrolyte layer formed between the cathode active material layer and the anode active material layer,
wherein
the battery is a fluoride ion battery,
the electrolyte layer contains a liquid electrolyte for a fluoride ion battery comprising:
an ionic liquid containing a fluoride complex anion represented by the following general formula (1), and an anion acceptor with an acceptor number of 75 or more, or
an ionic liquid containing a fluoride complex anion represented by the following general formula (2), and an anion acceptor with an acceptor number of 70 or more,

[Chemical formula 1]

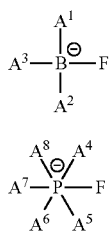

General Formula (1)

General Formula (2)

where $A^1$ to $A^8$ are each independently fluorine, an alkyl group with a carbon number of 5 or less, a fluoroalkyl group with a carbon number of 5 or less, or an ether group such that part of carbon of the alkyl group or the fluoroalkyl group is substituted with oxygen, and a concentration of the anion acceptor in the liquid electrolyte is 0.4 mol/kg or less.

11. The battery according to claim 10, wherein the anion acceptor is tripentafluorophenylborane.

12. The battery according to claim 10, wherein a ratio of $F(HF)_x^-$ anion to all anions existing in the liquid electrolyte is 0.5 mol % or less.

13. The battery according to claim 10, wherein the cathode active material layer contains a cathode active material selected from the group consisting of a fluoride of a metal alone, a fluoride of an alloy, a fluoride of a metal oxide, a fluorinated carbon material, and a fluorinated polymer material.

14. The battery according to claim 13, wherein a metallic element contained in the cathode active material is at least one of Cu, Fe, Ag, Co, Bi, and Pb.

15. The battery according to claim 10, wherein the anode active material layer contains an anode active material selected from the group consisting of a fluoride of a metal alone, a fluoride of an alloy, a fluoride of a metal oxide, a fluorinated carbon material, and a fluorinated polymer material.

16. The battery according to claim 15, wherein a metallic element contained in the anode active material is at least one of Mg, Al, Ce, Ca, La, and Pb.

* * * * *